United States Patent [19]
Moyer et al.

[11] Patent Number: 6,073,252
[45] Date of Patent: Jun. 6, 2000

[54] DATA PROCESSING SYSTEM WITH MEMORY PATCHING AND METHOD THEREOF

[75] Inventors: William C. Moyer, Dripping Springs; Claude Moughanni; Taimur Aslam, both of Austin, all of Tex.

[73] Assignee: Motorola, Inc., Schaumburg, Ill.

[21] Appl. No.: 08/937,451

[22] Filed: Sep. 25, 1997

[51] Int. Cl.[7] .................................................. G06F 12/00
[52] U.S. Cl. .................................................. 714/7; 714/48
[58] Field of Search ............................ 714/7, 8, 6, 710, 714/145, 5, 48, 49, 766

[56] References Cited

U.S. PATENT DOCUMENTS

| | | | |
|---|---|---|---|
| 4,028,684 | 6/1977 | Divine et al. | 340/172.5 |
| 4,400,798 | 8/1983 | Francis et al. | 365/230.03 |
| 4,542,453 | 9/1985 | Patrick et al. | 364/200 |
| 4,603,399 | 7/1986 | Cheek et al. | 364/900 |
| 4,610,000 | 9/1986 | Lee | 364/200 |
| 4,751,703 | 6/1988 | Picon et al. | 371/10 |
| 4,769,767 | 9/1988 | Hilbrink | 364/174 |
| 4,802,119 | 1/1989 | Heene et al. | 364/900 |
| 5,481,713 | 1/1996 | Wetmore et al. | 395/700 |
| 5,493,674 | 2/1996 | Mizutani et al. | 395/182.04 |
| 5,557,771 | 9/1996 | Kawaguchi et al. | 714/7 |
| 5,581,697 | 12/1996 | Gramlich et al. | 714/35 |
| 5,694,566 | 12/1997 | Nagae | 714/7 |
| 5,796,974 | 8/1998 | Goddard et al. | 712/211 |
| 5,813,043 | 9/1998 | Iles et al. | 714/7 |

FOREIGN PATENT DOCUMENTS 3-176738  7/1991  Japan ................................. G06F 9/06

*Primary Examiner*—Robert W. Beausoliel, Jr.
*Assistant Examiner*—Christopher A Revak

[57] ABSTRACT

A method and apparatus for providing memory patching in a data process system (5). In one embodiment, access control register (32), found in protection registers (20), contains six fields corresponding to six blocks of memory within the ROM (14). Each field includes a patch protect bit (36 and 42) as well as other access protect bits such as read protect and execute protect. The access control unit (28) selectively outputs an access error to the CPU (10) based on the state of the protect bits corresponding to the block of memory being accessed. The patch protect bit, by way of a force patch exception signal (19), alerts the CPU (10) whether the corresponding block of ROM (14) requires a patch. If a patch is required, the maskable address comparator (50) defines the size of the memory patch where the size of the patch can range from a single address location to multiple lines or blocks of contiguous memory.

22 Claims, 3 Drawing Sheets

DATA PROCESSING SYSTEM WITH MEMORY PATCHING AND METHOD THEREOF

TECHNICAL FIELD OF THE INVENTION

This invention relates generally to data processing systems, and to memory patching in particular.

BACKGROUND OF THE INVENTION

Single-chip dataprocessors often include a read-only memory (ROM) to store critical interrupt and reset vectors. Often these interrupt and reset vectors are customer specified. In the case of custom dataprocessors and custom microcontroller units (MCUs), customer-supplied programs are also stored in a ROM which is a maskable memory. Mask ROMs are "programmed" at fabrication by using specific masks containing the custom program or customer-specified information. Errors in the manufacture of the masks as well as customer changes to this information are extremely expensive to correct as they require creation of a new mask. Generation of a mask is costly, and therefore it is desirable to avoid errors that occur due to the manufacture of the mask and changes necessitated by code modification.

Other portions of the memory map of a dataprocessor may also be prone to expensive errors. For instance, many single chip dataprocessors include relatively large arrays of electrically erasable programmable ROM (EEPROM) and/or erasable programmable ROM (EPROM). These memories tend to experience a relatively high probability of having one or more defectively manufactured locations. To overcome this situation, accesses to the addresses of defective locations must be mapped to a correct location. There is large circuitry overhead associated with this corrective mapping, as the defective location is not known to the designers of the dataprocessor and therefore circuitry must provide for variable location mapping.

With respect to the single chip dataprocessor, it is necessary to configure the dataprocessor to properly recognize its environment of both on-chip and off-chip peripherals and memory devices. This requires either software monitoring or memory configuration. Software monitoring involves continuously monitoring address outputs and modifying addresses consistent with system configuration. Alternately, the memory map of the dataprocessor may be configured once, presumably at reset, and the resultant mapping is used until the device is powered down or some other predetermined event occurs.

One solution for overcoming defective memory locations and implementing changes to existing non-volatile memories is to use memory patching. Patching a memory involves mapping attempted accesses of a memory location or locations to a replacement location which holds the corrected or non-defective information. The replacement location is called the patch as it contains the information to be used in place of the originally accessed location. The need to patch defective or obsolete ROM by overlaying, or substituting, good memory locations is one which has long been recognized in the context of board-level memory products. Many systems, while applicable to a board-level memory system, are inflexible for application to a dataprocessor.

For example, according to one board-level memory patching scheme, particular locations in an EPROM are substituted for defective or obsolete locations in a ROM by means of a programmable logic array (PLA). The PLA is pre-programmed with information correlating the defective or obsolete addresses with their replacement locations in the EPROM. Again, this example is effective for board-level memory products, but is not particularly suited for implementation in a single chip dataprocessor or MCU.

Other examples perform patching by dedicating control logic to watch for addresses in the desired range of addresses to patch. Typically the desired range will include obsolete code or defective locations. Under these conditions, the dataprocessor actually accesses the patch region when an access is attempted to an address with the desired range. This method is not particularly useful in a single-chip MCU having a variable memory map, nor does it provide flexibility for re-configuration of a system to accommodate changing requirements.

One approach to ROM patching allows for the ability to patch every memory location, thus providing a fine granularity solution. By allowing patching of every memory location, it is possible to correct only those locations which are defective or incorrect. Although a very flexible method of ROM patching, the fine granularity approach requires excess hardware and circuitry in order to effect a patch. Another approach is to patch a block of memory; this method offers patching with coarse granularity and allows for reduced hardware compared to the fine granularity solution. Inefficiency exists when the block of memory to be patched contains good information that does not need to be patched. Therefore, coarse granularity can be redundant and wasteful. Further, the coarse granularity solution requires much memory to store the entire block of correct patch memory. Therefore, a need exists for a fine granularity approach offering flexibility while requiring minimal hardware.

DESCRIPTION OF THE PREFERRED EMBODIMENT

Figure 1:
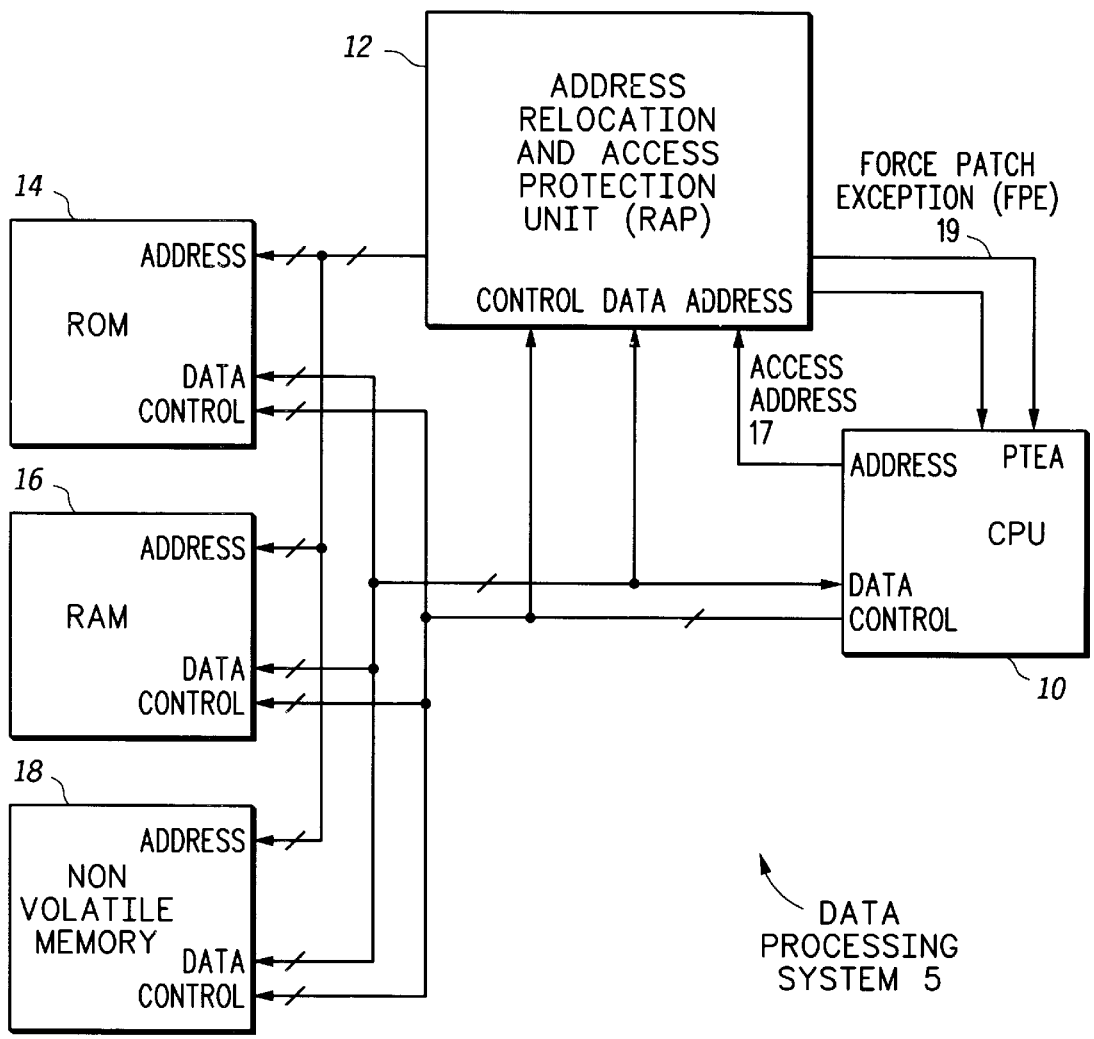
FIG. 1 illustrates, in block diagram form, a data processing system in accordance with one embodiment of the present invention.

The present invention is a method and apparatus for providing memory patching in a data process system 5. In one embodiment, access control register 32, found in protection registers 20, contains six fields corresponding to six blocks of memory within the ROM 14. Each field includes a patch protect bit 36, as well as other access protect bits such as read protect 38 and execute protect 34. The access control unit 28 selectively outputs an access error to the CPU 10 based on the state of the protect bits corresponding to the block of memory being accessed. The patch protect bit 36, by way of a force patch exception signal 19, alerts the CPU 10 whether the corresponding block of ROM 14 requires a patch. If a patch is required, the maskable address comparator 50 defines the size of the memory patch where the size of the patch can range from a single address location to multiple lines or blocks of contiguous memory.

In the following description of the preferred embodiment and figures, various terms and definitions are used for illustration. The terms "assert" and "negate" will be used when referring to the rendering of a signal, status or control bit, or similar apparatus into its logically true or logically false state, respectively. If the logically true state is a logic level one, the logically false state will be a level zero. And if the logically true state is a logical level zero, the logically false state will be a logic level one.

The term "bus" will be used to refer to a plurality of signals which may be used to transfer one or more of various types of information, such as data, address, control, or status.

DESCRIPTION OF THE FIGURES

The present invention is illustrated according to one embodiment in FIGS. 1–4. FIG. 1 illustrates one embodiment of a portion of a data processing system 5 having address relocation and access protection unit (RAP) 12, central processing unit (CPU) 10, read-only memory (ROM) 14, random-access memory (RAM) 16, and non-volatile memory 18. RAP 12 is coupled to CPU 10 by way of multiple conductors for providing signals such as addresses, data, and control. The CPU 10 receives a Force Patch Exception (FPE) signal, an access error signal, and a relocated address from the RAP 12. The RAP 12 is further coupled to the ROM 14, RAM 16, and non-volatile memory 18 by way of unidirectional conductors carrying address information from the RAP 12 to the memories 14, 16, and 18. The CPU 10 is also coupled to ROM 14, RAM 16, and non-volatile memory 18 by way of multiple conductors for providing data information among the CPU 10 and memories 14, 16, and 18. Each of the memories 14, 16, and 18 also receives control information via unidirectional conductors from the CPU 10. Note that alternate embodiments may incorporate any number of conductors or configurations which allow RAP 12 to communicate with CPU 10 and memories 14, 16, and 18. Additionally, alternate embodiments may incorporate any number of memories of various types.

Figure 2:
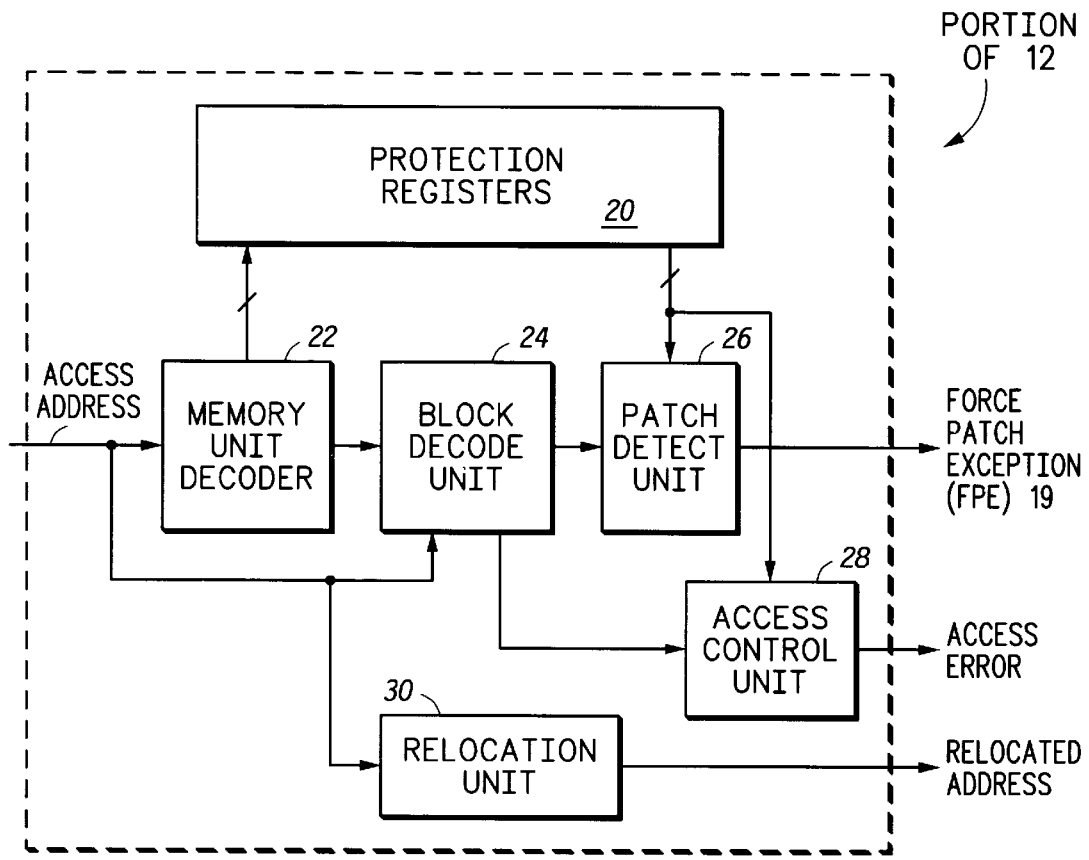
FIG. 2 illustrates, in block diagram form, address relocation and access protection unit of FIG. 1, in accordance with one embodiment of the present invention.

FIG. 2 illustrates one embodiment of a portion of the RAP 12 illustrated in FIG. 1. The RAP 12 includes protection registers 20, a memory unit decoder 22, a block decode unit 24, a patch detect unit 26, an access control unit 28, and a relocation unit 30. Protection register 20 is coupled to memory unit decoder 22, patch detect unit 26, and access control unit 28. CPU 10 of FIG. 1 is coupled to memory unit decoder 22, block decode unit 24, and relocation unit 30. Memory unit decoder 22 is further coupled to block decode unit 24. Block decode unit 24 is coupled to patch detect unit 26 and access control unit 28.

As illustrated in FIG. 2, CPU 10 provides an access address to the memory unit decoder 22, relocation unit 30 and the block decode unit 24. In response the memory unit decoder 22 provides a signal to the protection registers 20 to select the protection register associated with the received access address. Information from that register within protection registers 20 is then provided to the patch detect unit 26. If patch detect unit 26 determines that this location is to be patched, then patch detect unit 16 provides a patch control indicator, called a force patch exception (FPE), to the CPU 10. Also, signals from the memory unit decoder 22 are provided to the block decode unit 24 which outputs a signal to the patch detect unit 26 and the access control unit 28. The access control unit 28 also receives information from the protection registers 20. Any access errors cause access control unit 28 to output an access error signal, or access error indicator, to the CPU 10 to alert the CPU 10 of the access error. The access address is also provided to the relocation unit 30. Relocation unit 30 outputs a relocated address to the CPU 10. RAP 12 performs both address relocation and protection functions in data processing system 5.

Figure 3:
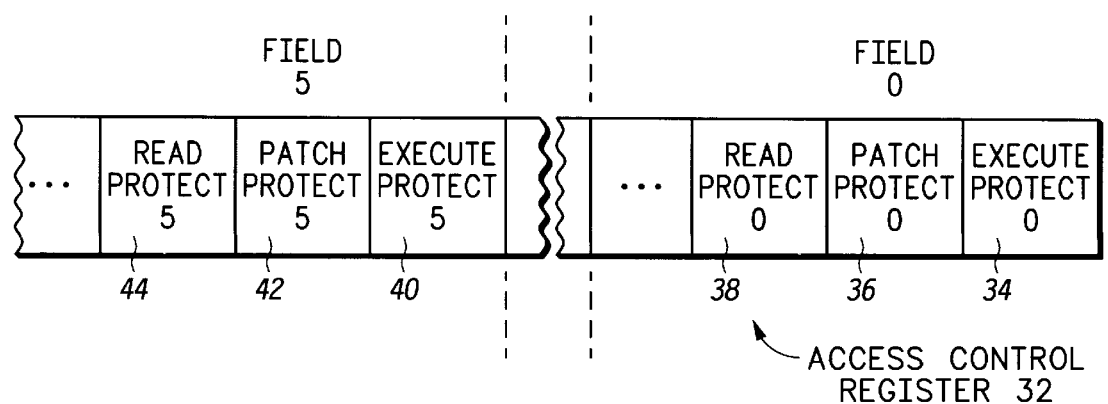
FIG. 3 illustrates, in block diagram form, an access control register in accordance with one embodiment of the present invention.

FIG. 3 illustrates one embodiment of a register of protection registers 20 illustrated in FIG. 2. The access control register 32 of FIG. 3 comprises six fields of memory numbered field 0 through field 5. Each field comprises a plurality of bits indicating various protections. For example, field 5 includes at least three bits, illustrated as the read protect 5 bit 44, the patch protect 5 bit 42, and the execute protect 5 bit 40. Read protect 5 bit 44 is used to control whether the memory location(s) associated with field 5 are to be read, or if they are protected and not to be read. If read protect 5 bit 44 indicates that field 5 is read protected, then a read access to field 5 is denied. Similarly, execute protect 5 bit 40 is used to control whether the memory location(s) associated with field 5 are to be executed, or if they are protected and not to be executed. If execute protect 5 bit 40 indicates that field 5 is execute protected, then an execute access to field 5 is denied. Likewise, patch protect 5 bit 42 is used to control whether the memory location(s) associated with field 5 are to be patched, or if they are protected and not to be patched. If patch protect 5 bit 42 indicates that field 5 is execute protected, then an execute access to field 5 is denied. Access control register 32 may include any number of fields and bits according to the size and configuration of the system.

Figure 4:
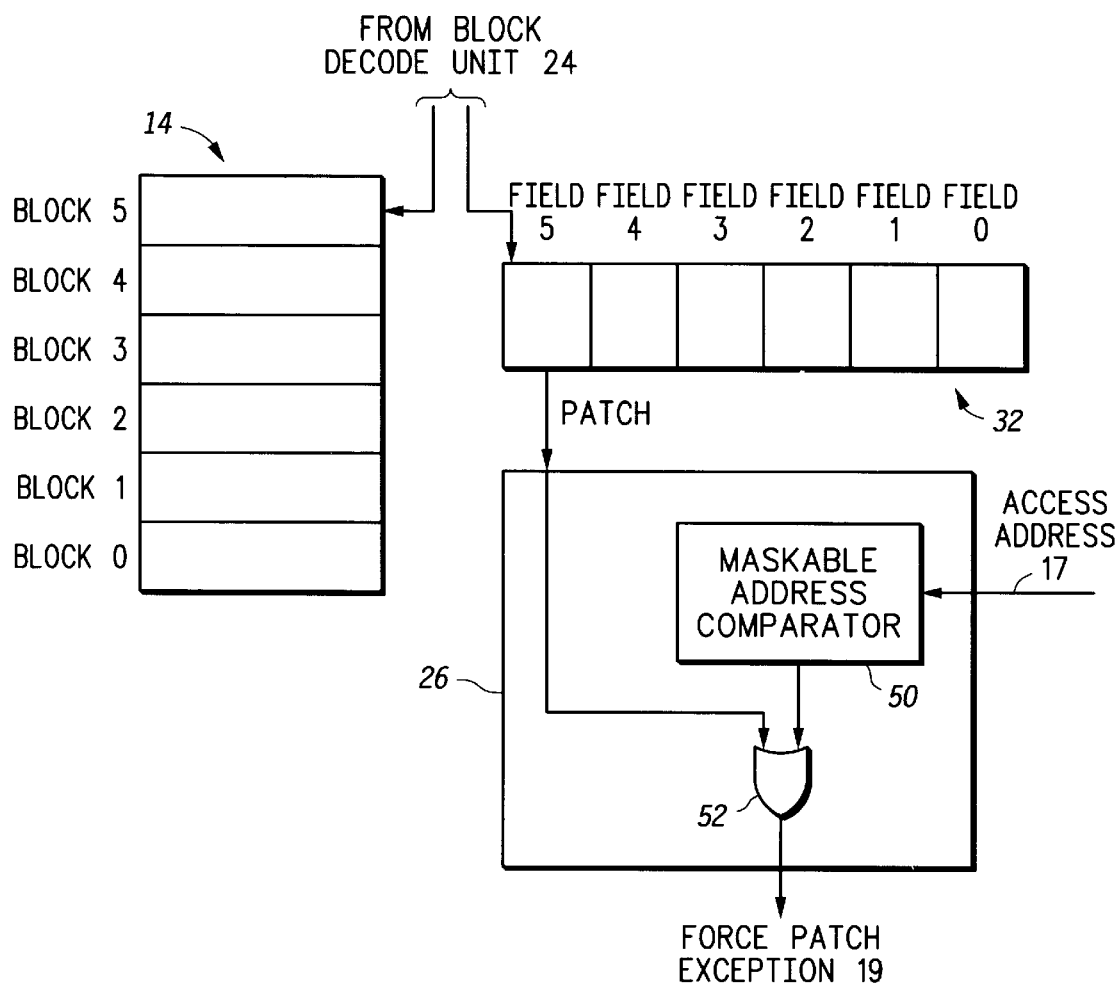
FIG. 4 illustrates, in block diagram form, a portion of a data processing system as illustrated in FIGS. 1, 2 and 3, in accordance with one embodiment of the present invention.

FIG. 4 illustrates one embodiment of a portion of data processing system 5 of FIGS. 1–3. ROM 14 as illustrated in FIG. 1, access control register 32 as illustrated in FIG. 3, as well as the patch detect unit 26 as illustrated in FIG. 2 are included in FIG. 4. Information from the block decode unit 24 of FIG. 2 selects the block in ROM 14 corresponding to the access address and indicates the associated field in access control register 32. Additionally, block decode unit 24 information selects the bit of access control register 32 according to the type of access that is attempted.

FIG. 4 details the circuitry involved if the type of access incurs a patch. The patch bit from the associated field in access control register 32 is provided to gate 52 of the patch detect unit 26. If the patch bit from the associated field in access control register 32 is asserted, the corresponding memory location is patch protected. And if the patch bit is negated, the corresponding memory location is not patch protected. Note that the patch bit is provided to patch detect unit 26 if the attempted access involves a patch. Maskable address comparator 50 may be any of a variety of circuits used for masked address comparison. Maskable address comparator 50 allows a range of addresses to be detected, and any address within that range will satisfy the comparator. For example, if data processing system 5 is a 16 bit data processing system (i.e. each address is defined by 16 bits) masking the least significant four bits of address while defining the upper twelve bits as hexidecimal $FFF, will result in valid comparisons of any address from $FFF0 and $FFFF, etc. In this way, maskable address comparator 50 masks the incoming access address. Gate 52 receives the output of the maskable address comparator 50 and the incoming patch bit. Gate 52 outputs a force patch exception if either the access address is within the range masked by maskable address comparator 50 or the patch bit corresponding to the access address is asserted. In FIG. 4 gate 52 is functionally illustrated as an OR gate, but may be any type of gate or gates, or other logic circuitry which implements the described function. Gate 52 outputs a signal to force a patch exception on the occurrence of either event described herein above. The maskable address comparator 50 offers fine granularity patching, while the patch bit offers coarse granularity patching within one data processing system and for the same memories.

In one embodiment of the present invention, but not shown in the figures, the patch detect unit 26 includes a memory management unit coupled to both the ROM 14 and the CPU 10. The memory management unit is then coupled to other memories within data processing system 5, such as RAM 16 and non-volatile memory 18.

Operation of the Preferred Embodiment

The operation of the present invention will now be described. The present invention describes a method of performing memory patching that incorporates advantages of both the fine granularity and coarse granularity approaches described above.

The protection registers 20 of FIG. 2 include a plurality of registers. An alternate embodiment may include a single register. The protection registers of protection registers 20 contain protection and access information for each memory portion. As illustrated in FIG. 1, protection registers 20 include protection and access information for memory portions ROM 14, RAM 16, and non-volatile memory 18. In alternate embodiments, protection information may be specific to only one type of memory, or a combination of memories. In still other embodiments, the patch protection information may be the only information in a field, or stored in combination with other protection information.

FIG. 3 illustrates one embodiment of access control register 32 found in protection registers 20. In one embodiment of the present invention, each field includes bits such as an execute protect 0 bit 34, a patch protect 0 bit 36 and a read protect 0 bit 38, all contained in field 0 and corresponding to a block of memory designated as block 0 of the associated memory unit. Likewise, execute protect 5 bit 40, patch protect 5 bit 42, read protect 5 bit 44, within field 5 of access control register 32, correspond to a block of memory designated block 5 of the associated memory unit. Each memory unit, such as the ROM 14, RAM 16, and non-volatile memory 18 has a corresponding access control register containing fields corresponding to each of the blocks within that memory unit. The read protect bit would determine whether a read was allowed to that block of memory. Likewise an execute protect bit would determine whether a portion of code could be executed from that block of memory. Another bit in each field of access control register 32 could also be a write protect bit. This write protect bit would determine whether a write would be allowed to that memory block within that memory unit.

In one embodiment of the present invention, a memory such as ROM 14, which is a read-only memory, would not need the write bit since a ROM cannot be written to. In this case, the write bit could be replaced with the patch protect bit since the patch protect bit will generally be used for read-only type memories. Memories such as RAM 16 and non-volatile memory 18 can be independently modified. In alternate embodiments, an extra patch protect bit could be added to each field of the access control register 32 for ROM 14, however, it may be desired to use a patch operation with these memories depending on the application. Alternatively, the read, execute and write protect bits can all be replaced with a single absolute protection bit which would prevent any sort of access to this memory block.

Each field in the access control register 32 can contain as many bits as necessary. If it turns out that the number of bits multiplied by the number of fields (i.e. the total bit length required for the access register) is greater than the total bit length of the machine, multiple registers may be needed. For example, if the bit length of the machine is 32-bits, and the memory unit which the register corresponds to contains six fields of six bits each, the total bit length required in the access register would be 36-bits, which is longer than the allowed 32-bits. In this case, multiple registers would be needed to adequately represent this memory unit. In one embodiment of the present invention, all access control register 32 in protection registers 20 are of equal bit length. In alternate embodiments, the bit length of each access control register 32 is determined by its associated memory portion.

In one embodiment of the present invention ROM 14 is a 6K ROM separated into six blocks of 1K each as illustrated in FIG. 4. These blocks allow for patching of the entire 1K block of memory. In alternate embodiments, a memory portion of any size can be used and likewise can be divided into any number of blocks of equal size. The number of fields in access control register 32 corresponds to the number of blocks designated in ROM 14. Note that it is not necessary that each block of ROM 14 correspond to a block. Once a memory portion is designated as a block, the block is then associated with a field in access register 32. Therefore, in one embodiment of the present invention, access control register 32 contains six fields 0 to 5. The bits in fields 0 to 5 of access register 32 then correlate to the protection information and other information associated with blocks 0 to 5 of ROM 14, respectively.

The incoming access address to the RAP 12 will determine which memory portion to access. The memory unit decoder 22 takes this access address and determines which memory portion to access (i.e., the ROM 14, RAM 16, or non-volatile memory 18). Information from the memory unit decoder 22 then determines which of the protection registers 20 will be needed for the accessed memory portion. Block decode unit 24 uses the access address 17 and information from the memory unit decoder 22 to determine which block within the chosen memory portion will be accessed. For example, in one embodiment of the present invention, block 5 of the ROM 14 is chosen by the access address as illustrated in FIG. 4. Therefore, since access register 32 corresponds to ROM 14, the fifth field of access register 32 is selected.

The patch protect bit 42 from field 5 of access register 32 is provided to patch detect unit 26, which uses the state of the patch detect bit to determine if block 5 of ROM 14 is to be patched. If block 5 does require a patch, patch detect unit 26 will output a force patch exception (FPE) 19 to be received by CPU 10. The FPE signal 19 can be designed to alert the CPU 10 of a patch in a variety of ways. For example, FPE 19 may trigger a hardware interrupt, a software interrupt, or set a flag that is periodically polled. Note that if the access is to any memory location within block 5, and the patch bit indicates a patch for block 5, the access results in a patch. The patch protection is also subject to the other protections of the memory location. For example, consider a memory location with protection indicated in protection register 32 as follows: execution protected; write protected; read allowed; to be patched. If a write is attempted to this memory location, it will not be allowed, even though the patch protect bit indicates a patch. The only access that will be allowed is for a read access, and in that case the memory location will be patched and the patch will be read.

Patch detect unit 26 also performs maskable addressing to allow address specific patching. The maskable address comparator 50 defines the size of the memory patch. For example, one memory location can be replaced at a time or, depending on the address mask used, a larger block of contiguous memory can be patched depending on the needs of the data processing system 5. This function is accomplished with the maskable address comparator 50 as illustrated in FIG. 4. Gate 52 of patch detect unit 26 implements either the block patching or the address patching. According to one embodiment, RAP unit 12 includes a relocation unit 30, as illustrated in FIG. 2, which provides a relocated address to the CPU 10 corresponding to the address of the portion of memory. The relocated address acts as the patch for the memory within the ROM 14. Therefore, the relocation unit 30 allows the CPU 10 to temporarily transfer control to a different memory location.

In one embodiment of the present invention, the access control unit 28 of FIG. 2 uses the other protect bits such as read protect bits 38 and 44, execute protect bits 34 and 40, and possibly other protect bits found in the access control register 32, to determine whether access is allowed to a specific block of memory. Once again, if the fifth block of ROM 14 is being accessed, then read protect bit 44, execute protect bit 40, and any other protect bits found within field 5 of access control register 32 would provide access information corresponding to block 5 of memory. If the access being attempted is prohibited by the status of the protect bits, then the access control unit 28 outputs an access error signal to the CPU 10. Just as the FPE signal 19 explained above, the access error signal can trigger a hardware or software interrupt, or it can be a flag that can be periodically polled. Note that the access error may also be indicated by a bit in a register or a flag, or alternately may include multiple signals to indicate specifics about the attempted access.

One embodiment of the present invention allows for two disjoint locations in memory to be patched. In alternate embodiments, though, it is possible to allow for any number of disjoint locations. Typically, each disjoint location having patch capability would use a separate set of hardware, which may include another maskable address comparator and gate similar to maskable address comparator 50 and gate 52, respectively. These added components can be added within the patch detect unit 26, or, in alternate embodiments, they can form a separate unit(s) or be incorporated into already existing units. In this manner, the number of patch locations allowed is dependent on the design and needs of the data processing system 5.

Therefore, it has been illustrated how to perform ROM patching using a combination of both fine granularity and coarse granularity. A single patch bit can be associated with each block of memory within a memory unit such as a ROM. In addition, as little as one address location may be patched or, through the use of address masking, multiple lines or blocks of contiguous memory can be replaced. Therefore, the present invention achieves the goals of finer granularity with flexibility and a minimal amount of hardware.

While the present invention has been illustrated and described with reference to specific embodiments, further modifications and improvements will occur to those skilled in the art. It is to be understood, therefore, that this invention is not limited to the particular forms illustrated and that it is intended in the appended claims to cover all modifications that do not depart from the spirit and scope of this invention.

What is claimed is:

1. A data processing system having a central processing unit (CPU), the data processing system comprising:
    a first memory having N equal size blocks, where N is an integer, each of the N equal size blocks comprising a plurality of memory locations; and
    a first control unit coupled to the CPU and the first memory, the first control unit comprising:
        a first register having a plurality of fields, each of the plurality of fields having a patch protect bit, each of the plurality of fields having a first access control bit;
        a block decode unit coupled to the CPU, the block decode unit receiving address information from the CPU and determining a first block within the N equal size blocks corresponding to the address information, the first block having a corresponding field in the first register;
        an access control unit coupled to the first register, the access control unit receiving an identification of the first block from the block decode unit, and in response to receiving the identification of the first block the access control unit selecting the corresponding field in the first register, the access control unit selectively providing an access error indicator based on the status of the first access control bit; and
        a patch detect unit coupled to the first register and the block decode unit, the patch detect unit receiving the identification of the first block from the block decode unit, and in response to the identification of the first block the patch detect unit selecting the corresponding field in the first register;
    wherein the patch detect unit provides an exception signal to the central processing unit if the patch protect bit in the corresponding field is asserted.

2. A data processing system as in claim 1, wherein the first memory is a read only memory.

3. A data processing system as in claim 1, further comprising:
    a second memory having a plurality of equal size blocks, each of the plurality of equal size blocks comprising a plurality of memory locations; and
    a memory unit decoder, the memory unit decoder receiving access address information from the CPU and in response selecting one of the first memory and the second memory.

4. A data processing system as in claim 3, wherein the second memory is selected from a group consisting of a random-access memory and a non-volatile memory.

5. A data processing system as in claim 3, further comprising:
    a second register having a plurality of fields, each of the plurality of fields having a second access control bit.

6. A data processing system as in claim 5, wherein the second access control bit indicates write protection and the second access control bit has a first bit location in the second register;
    wherein the patch protect bit has a second bit location in the first register; and
    wherein the first bit location is the same as the second bit location.

7. A data processing system as in claim 5, wherein the first register and the second register have equivalent bit lengths.

8. A data processing system as in claim 1, wherein read protection is indicated when the first access control bit is asserted.

9. A data processing system as in claim 1, wherein each of the plurality of fields has a third access control bit for indicating execution protection.

10. A data processing system as in claim 1, wherein read protection and execution protection are indicated when the first access control bit is asserted.

11. A data processing system as in claim 1, further comprising:

an address comparator, the address comparator receiving the address information from the CPU, the address comparator having a predetermined address range, the address comparator comparing the address information from the CPU to the predetermined address range and providing a comparison result;

wherein the patch detect unit combines the comparison result with the patch protect bit of the corresponding field and provides a combination result; and wherein the patch detect unit provides a patch control indicator to the central processing unit based on the combination result.

12. A data processing system as in claim 1, wherein the patch detect unit comprises:

a memory management unit coupled to the first memory and the CPU.

13. A method for memory patching in a data processing system, the data processing system having a central processing unit (CPU) and a first memory, the method comprising the steps of:

receiving a first access address;

decoding the first access address;

identifying a first memory block within the first memory accessible by the first decodes access address;

selecting a first field in an access register, the first field being associated with the first memory block, the first field having a patch control bit and an access control bit;

providing a patch control exception indicator to the CPU if the patch control bit is asserted.

14. A method for memory patching as in claim 13, wherein the data processing system has a second memory, the method further comprising the step of:

selecting a next access memory from the first and second memories.

15. A method for memory patching as in claim 13, wherein assertion of the access control bit prevents read access to the first access address.

16. A method for memory patching as in claim 13, wherein assertion of the access control bit prevents execution access to the first access address.

17. In a data processing system comprising:

a first memory partitioned into a first block accessible by an address selected in a first address range, and a second block accessible by an address selected in a second address range; and a central processing unit (CPU) adapted to provide a selected one of said access addresses;

an access protection unit comprising:

a decoder for receiving the selected access address and generating a first select signal when the selected access address is in the first address range, and a second select signal when the selected access address is in the second address range;

a patch register, coupled to the decoder, having a first and a second patch protect bit, the register asserting a first patch protect signal as a function of the first patch protect bit in response to receiving said first select signal, and asserting a second patch protect signal as a function of the second patch protect bit in response to receiving said second select signal; and a patch detect unit coupled to the register, the patch detect unit asserting a force patch signal in response to assertion of one of the first and second patch protect bits.

18. The access protection unit of claim 17, wherein said patch detect unit is coupled to the CPU and provides the force patch signal to said CPU.

19. The access protection unit of claim 17, further characterized in that in response to assertion of said first patch protect signal said first block is patched.

20. The access protection unit of claim 19, wherein the data processing system further comprises an address relocation unit for selectively relocating said selected access address in response to assertion of one of said first and second patch protect signals.

21. The access protection unit of claim 19, further comprising:

an address comparator for receiving the selected access address, the address comparator having a predetermined address range, the address comparator comparing the selected access address to the predetermined address range and providing a comparison result; and wherein the patch detect unit further comprises:

a gate coupled to the address comparator and the patch register, the gate adapted to output the force patch exception signal in response to the comparison result if the selected access address is within the predetermined address range and adapted to output the force patch exception signal in response to assertion of one of the first and second patch protect bits.

22. The access protection unit of claim 21, wherein the address comparator provides fine granularity patching and the patch register provides coarse granularity patching.

\* \* \* \* \*

UNITED STATES PATENT AND TRADEMARK OFFICE
CERTIFICATE OF CORRECTION

PATENT NO. : 6,073,252
DATED : June 6, 2000
INVENTOR(S) : William C. Moyer, et al.

It is certified that error appears in the above-identified patent and that said Letters Patent is hereby corrected as shown below:

<u>Column 10,</u>
Line 30, after claim, delete "19" and insert -- 17 --.

Signed and Sealed this

Seventh Day of August, 2001

*Attest:*

*Nicholas P. Godici*

*Attesting Officer*

NICHOLAS P. GODICI
*Acting Director of the United States Patent and Trademark Office*